May 1, 1951 C. E. TACK 2,550,731
BRAKE ADJUSTING MEANS
Filed June 22, 1946
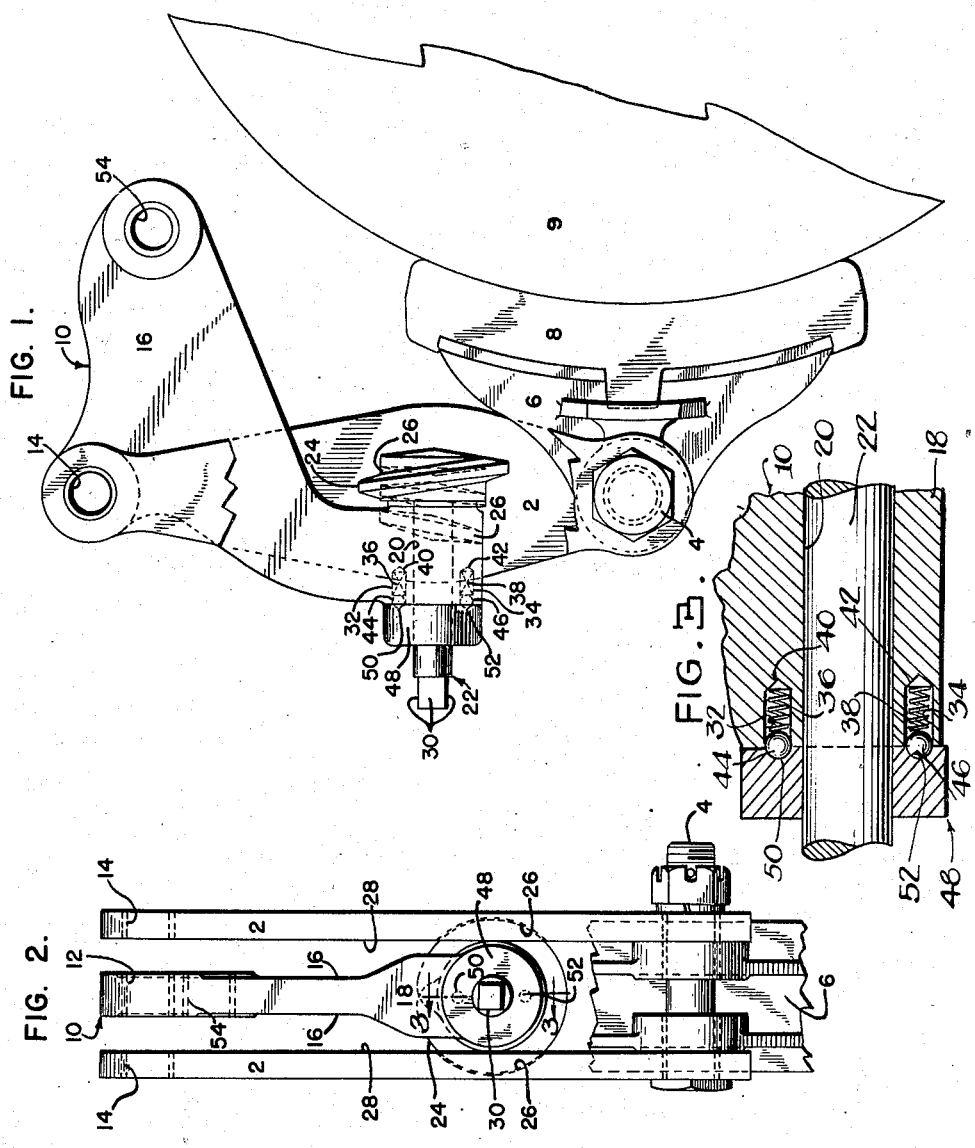
INVENTOR.
CARL E. TACK
BY
ATTORNEY Patented May 1, 1951

2,550,731

UNITED STATES PATENT OFFICE 2,550,731

BRAKE ADJUSTING MEANS

Carl E. Tack, Chicago, Ill., assignor to American Steel Foundries, Chicago, Ill., a corporation of New Jersey Application June 22, 1946, Serial No. 678,584

7 Claims. (Cl. 188—196)

My invention relates to railway brake equipment and more particularly to a novel slack adjuster therefor.

An object of my invention is to provide in a brake arrangement of the clasp brake or single shoe type a slack adjuster of simple design and comprising a minimum of parts and taking up a minimum of space.

Another object of my invention is to provide an efficient and durable brake slack adjuster which includes a self-cleaning open adjusting screw.

Usually, the slack adjuster has been provided on the brake rod and includes a manually operated screw mechanism for adjusting the connection between certain brake levers of the brake rigging, whereby the slack caused by the wear of the brake shoes and the wheels and the wear on the members of the brake rigging can be eliminated. It is the object of my invention to provide a slack adjuster which may be mounted upon the lower end of a brake lever and may comprise a manually operated screw mechanism threaded into associated hangers for adjusting the slack conditions in the brake rigging by adjusting the lever with respect to said hangers and simultaneously modifying the position of the brake lever where it is connected to the associated brake rigging.

A further object of my invention is to design a slack adjuster which may be positioned on the lower end of a brake lever where it is easily accessible when adjustment of the slack in the brake rigging must be made.

The various novel features of my invention will be apparent from the following description and drawings.

In the drawings, Figure 1 is a side elevation of a brake mechanism embodying my invention, one hanger being broken away in part to show the slack adjusting means and more clearly illustrate my invention.

Figure 2 is an elevation taken from the left as seen in Figure 1 with a fragmentary view of the brake head and shoe assembly; and Figure 3 is a fragmentary enlarged sectional view taken substantially on the line 3—3 of Figure 2.

Describing my invention in detail, the spaced parallel hangers designated 2, 2 are at their respective lower extremities pivotally connected by means of a nut and bolt assembly 4 (Figure 2) to a brake head 6 carrying the shoe 8 for engagement with the periphery of a wheel 9.

Interposed between said hangers 2, 2 is an elbow brake lever 10 having a bushed opening 12 aligned with bushed openings 14, 14 (Figure 2) formed at the upper ends of said hangers 2, 2, said openings providing means for pivotal connection of said hangers and brake lever to associated supporting means.

The lever 10 has side faces 16, 16 at opposite sides thereof, said side faces flaring outwardly adjacent the lower end of said lever and then paralleling each other adjacent the hangers 2, 2 and forming the thickened portion 18 having a through opening 20, as illustrated in Figure 1, for reception of a round bolt-like member 22 extending beyond the opposite edges of said lever.

The bolt 22 has a male thread 24 on its inner end threaded into complementary female partial threads or slots 26, 26 formed on adjacent surfaces 28, 28 of said hangers 2, 2. It will be noted that bolt 22 is of largest cross section at its inner end, of reduced cross section at its midportion, and square-cut at its outer end as at 30 where the bolt may be gripped and turned with a wrench.

Interrupting the outer edge of said lever 10 are bored openings 32 and 34 parallel to and equally spaced at opposite sides of said through opening 20. The springs 36 and 38, diagrammatically illustrated in Figure 1, are received within said openings 32 and 34, respectively, one end of each spring 36 and 38 being seated as at 40 and 42 respectively, while the other end of each spring supports spherical bearings 44 and 46 respectively.

A ring 48 is sleeved over said member 22 and secured thereto adjacent said outer end 30 by any conventional means, such as welding or press-fitting. The inner edge of said ring 48 rests against the outer edge of said thickened portion 18 of said lever 10 and bears against the bearings 44, 46 compressing the springs 36 and 38 and forcing said bearings into their respective openings.

Small dimples or pockets 50 and 52 are formed on the inner edge of said ring 48, said pockets being aligned with said openings 32 and 34 and providing seats for said bearings 44 and 46 respectively. It will be noted that upon turning said member 22, the bearings 44 and 46 slip out of said pockets 50 and 52 and that upon the completion of a half turn of said member 22 the bearing 44 will seat in the pocket 52 and the bearing 46 will seat in pocket 50.

The assembly just described provides a catch means for said member 22 and prevents unscrewing of said member with respect to said hangers 2, 2. It will be further noted that the ring 48 prevents disassembly of said bolt 22 with respect to said lever 10.

It will be noted that for purposes of clarity I have illustrated only two pockets 50 and 52, but additional similar pockets may be provided as needed.

The brake lever 10 at its upper end has an opening 54 formed and arranged for connecting said lever to the associated brake rigging (not shown) in the conventional manner.

To assemble my invention, the lever 10 is inserted between the hangers 2, 2 and the opening 12 of said lever 10 is aligned with openings 14, 14 of the adjacent hangers 2, 2. Means (not shown) are inserted into said openings for securing said hangers and lever to the associated supporting means. The bolt-like member 22 is then inserted into the through opening 20 from the inner edge of the brake lever 10 so that the male threaded portion of the bolt 22 rests adjacent the inner edge of the brake lever 10 and the outer portion 30 of said bolt 22 is adjacent the outer edge of said brake lever. The springs 36 and 38 are next inserted into respective openings 32 and 34 and the respective ball bearings 40 and 42 are placed upon the respective springs 36 and 38. The ring 48 is next sleeved over the outer end of said member 22, the inner edge of said ring 48 being brought to bear against the outer edge of the thickened portion 18 of said lever 10. The ring 48 is next secured to the member 22 of any conventional means. To secure the brake lever 10 to the associated brake rigging, a pin (not shown) is inserted into the opening 54 of said lever, said pin extending into aligned openings in the associated brake rigging. The male threaded portion 24 is then threaded into the female threads 26, 26 formed on said brake hangers and the bolt 22 is turned until the proper slack adjustment is made between the brake lever 10 and the associated brake rigging.

It may be noted that although I have illustrated my invention with a plurality of hangers, a single bifurcated hanger may be used instead as will be readily understood by those skilled in the art.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a railway brake arrangement, spaced parallel brake hangers carrying between their lower ends a brake head and shoe assembly, a brake lever interposed between said hangers and having one end thereof pivotally connected to associated brake rigging, supporting means pivoting said hangers and lever, a boltlike member rotatably mounted in said lever and having a threaded end, means fixing said member to said lever against axial movement in either direction relative thereto, and means formed on adjacent sides of said hangers receiving said threaded end, said member in cooperation with said last-mentioned means being operable for adjusting the slack between said lever and said brake rigging and serving to transmit braking forces from said lever to said hangers in compression.

2. In a slack adjuster for railway brake rigring, in combination, spaced parallel hangers supporting braking means, an elbow brake lever between said hangers, means pivoting said hangers and lever, brake rigging pivotally connected to one end of said lever, slack adjusting means comprising a round boltlike member rotatably mounted elsewhere in said lever, means fixing said member against axial movement in either direction with respect to said lever, screw means on said member, and complementary diametrically opposed screw-engaging means on the adjacent sides of said hangers connecting said member to said hangers.

3. A slack adjuster including in combination, a pair of brake hangers and an elbow brake lever therebetween, pivotal means supporting said hangers and lever from an associated truck frame and affording a pivotal connection between said hangers and lever, brake rigging connected to one end of said lever, an adjusting element mounted elsewhere in said lever, means fixing said element against all except rotative movement with respect to said lever, and interengaging screw means on said hangers and said element for adjusting the position of said lever relative to said brake rigging for thereby taking up slack in said rigging.

4. In a railway brake rigging, spaced parallel hangers carrying brake means therebetween for engagement with the tread of an associated wheel, a brake lever interposed between said hangers and having one end thereof pivotally connected to a portion of said rigging, a member mounted elsewhere in said lever and rotatable relative to said lever, means on said member fixing the same with said lever against axial movement relative thereto, and interengaging adjusting means on said member and said hangers for relatively adjusting the position of said lever with respect to said hangers and brake rigging.

5. In a railway brake arrangement, in combination, spaced parallel hangers, a brake head between said hangers, means extending through said hangers and head affording a pivotal connection therebetween and urging said hangers into frictional engagement with said head to prevent free rotation thereof, an elbow lever between said hangers, means extending through said hangers and said lever affording a pivotal connection therebetween and suspending the same from an associated truck frame, brake rigging connected to one end of said lever, an elongated member rotatably mounted elsewhere in said member and having ends extending outside said lever, a head on one end of said member and a collar fixed to the other end of said member, said head and collar receiving said lever therebetween and holding said member against longitudinal movement relative to said lever, and threads on said head of said member and adjacent sides of said hangers arranged in cooperative relation for adjusting the relative position of said hangers and lever upon rotation of said member.

6. In a railway brake rigging, a pair of spaced parallel hangers, means extending through the upper ends of said hangers affording a pivotal support therefor from an associated truck frame, a lever interposed between said hangers and pivoted intermediate its ends on said means and connected at one end to said rigging, and an adjusting bolt rotatably mounted in the other end of said lever and connected to said lever against axial movement relative thereto, and an interengaging screw means on said bolt and hangers for adjusting the relative position between said lever and hangers and thus taking up slack in said rigging.

7. In a railway brake rigging, spaced hangers pivotally suspended from an associated car truck at one end and pivotally carrying a brake head at its other end, a lever pivoted intermediate its ends with said hangers at their points of suspension and having a connection with said rigging at one end and an adjustable connection with said levers at the other end, said adjustable connection comprising a bolt extending through said lever, means on said bolt at opposite sides of said lever in abutment therewith for preventing axial movement of said bolt, and interengaging threads on said bolt and said hangers, said bolt being rotatable for modifying the position of said lever with respect to said hangers through engagement of said threads.

CARL E. TACK.

REFERENCES CITED

The following references are of record in the file of this patent:

UNITED STATES PATENTS

| Number | Name | Date |
|---|---|---|
| 1,241,147 | Plath | Sept. 25, 1917 |
| 1,959,116 | Temple | May 15, 1934 |
| 2,015,881 | Alden | Oct. 1, 1935 |